US012234786B2

(12) United States Patent
Iga et al.

(10) Patent No.: US 12,234,786 B2
(45) Date of Patent: Feb. 25, 2025

(54) ENGINE CONTROL DEVICE AND ENGINE DEVICE

(71) Applicant: KUBOTA CORPORATION, Osaka (JP)

(72) Inventors: Michisuke Iga, Sakai (JP); Tomotaka Tanaka, Sakai (JP); Kosuke Aoki, Sakai (JP); Hiroyuki Kawasoe, Sakai (JP); Kengo Hidaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/663,584

(22) Filed: May 14, 2024

(65) Prior Publication Data

US 2024/0384692 A1   Nov. 21, 2024

(30) Foreign Application Priority Data

May 19, 2023   (JP) ................. 2023-083414

(51) Int. Cl.
| | |
|---|---|
| *F02D 41/22* | (2006.01) |
| *B60K 17/02* | (2006.01) |
| *B60K 17/08* | (2006.01) |
| *F02D 41/00* | (2006.01) |
| *F02D 41/40* | (2006.01) |

(52) U.S. Cl.
CPC ......... *F02D 41/22* (2013.01); *F02D 41/0002* (2013.01); *F02D 41/401* (2013.01); *B60K 17/02* (2013.01); *B60K 17/08* (2013.01); *F02D 2041/227* (2013.01); *F02D 2200/0404* (2013.01); *F02D 2200/0614* (2013.01); *F02D 2200/101* (2013.01)

(58) Field of Classification Search
CPC .... F02D 41/22; F02D 41/0002; F02D 41/401; F02D 2041/227; F02D 2200/0404; F02D 2200/0614; F02D 2200/101; B60K 17/02; B60K 17/08
See application file for complete search history.

(56) References Cited

FOREIGN PATENT DOCUMENTS

| | | | |
|---|---|---|---|
| JP | 2003-161194 | | 6/2003 |
| JP | 2011089485 A | * | 5/2011 |
| KR | 2003084733 A | * | 11/2003 ............ B60W 10/04 |

OTHER PUBLICATIONS

Machine Translation of KR-2003084733-A PDF File Name: "KR2003084733A_Machine_Translation.pdf" (Year: 2003).*
Machine Translation of JP-2011089485-A PDF File Name: "JP2011089485A_Machine_Translation.pdf" (Year: 2011).*

* cited by examiner

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

Provided is an engine control device and an engine device that enable stable self-travelling of the engine in a limp home mode. The engine control device includes a revolution speed detection unit that detects revolution speed of the engine, and an arithmetic unit that calculates an opening of a throttle valve opened by an electronic throttle mechanism, and an injection amount of fuel injected by injectors. In an operation of the engine in the limp home mode, in a case where the revolution speed of the engine detected by the revolution speed detection unit exceeds a predetermined limiting value, the arithmetic unit performs an operation to suppress injection of the fuel to be injected by the injectors.

8 Claims, 2 Drawing Sheets

ENGINE CONTROL DEVICE AND ENGINE DEVICE

BACKGROUND OF THE INVENTION

1. Field of the Invention

The present invention relates to an engine control device and an engine device that control an engine equipped with an electronic throttle mechanism and a fuel injection mechanism.

2. Description of the Related Art

In an engine device that controls the opening of a throttle valve using an electronic throttle mechanism, if any problem happens to the electronic throttle mechanism, control is performed in a limp home mode in which self-traveling is enabled by the opening of the throttle valve, which is mechanically maintained.

Japanese Patent Application Publication No. 2003-161194 discloses an engine control device that improves the retreat operation performance when an abnormality occurs to the electronic throttle control system. In this engine control device, in a case where a major abnormality occurs, a first abnormality storage element is activated, a first alarm/indicator is activated by de-energizing a load relay for a power supply circuit of a throttle valve open/close control motor, and a retreat operation is performed using first means, based on a fuel cut control. In a case where a minor abnormality occurs, a second abnormality storage element is activated, a second alarm/indicator is activated, and a retreat operation is performed using second means, based on both the throttle valve opening control by the motor and the fuel cut control.

SUMMARY OF THE INVENTION

In the limp home mode of the engine, the throttle valve cannot be controlled electronically, therefore the self-traveling must be enabled by the opening that can be mechanically maintained (default opening). The default opening here has a variation which occurs within a range of tolerance of a valve rotation mechanism unit for rotating the throttle valve. Hence it is desirable to enable stable self-traveling in the limp home mode considering this variation within the tolerance of the default opening.

With the foregoing in view, it is an object of the present invention to provide an engine control device and an engine device that enable stable self-traveling of the engine in the limp home mode.

An aspect of the present invention is an engine control device to control an engine equipped with an electronic throttle mechanism and a fuel injection mechanism. The engine control device includes: a revolution speed detection unit that detects revolution speed of the engine; and an arithmetic unit that calculates an opening of a throttle valve opened by the electronic throttle mechanism, and an injection amount of fuel injected by the fuel injection mechanism. In the operation of the engine in a limp home mode, in a case where the revolution speed of the engine detected by the revolution speed detection unit exceeds a predetermined limiting value, the arithmetic unit performs an operation to suppress the injection of the fuel to be injected by the fuel injection mechanism.

Another aspect of the present invention is an engine device, including an engine control device to control an electronic throttle mechanism and a fuel injection mechanism, and a driving mechanism that is driven by output of an engine. The driving mechanism includes a clutch that is installed in a subsequent stage of the engine, and a transmission unit that is installed in a subsequent stage of the clutch and includes a driving gear to transmit output of the engine. The engine control device includes a revolution speed detection unit that detects revolution speed of the engine, and an arithmetic unit that calculates an opening of a throttle valve opened by the electronic throttle mechanism, and an injection amount of fuel injected by the fuel injection mechanism. In an operation of the engine in a limp home mode, in a case where the revolution speed of the engine detected by the revolution speed detection unit exceeds a predetermined limiting value, the arithmetic unit performs an operation to suppress injection of the fuel to be injected by the fuel injection mechanism.

According to the present invention, an engine control device and an engine device that enable stable self-traveling of the engine in the limp home mode can be provided.

DESCRIPTION OF THE PREFERRED EMBODIMENT

A preferred embodiment of the present invention will now be described with reference to the drawings.

The embodiment to be described below is an example of applying the present invention, and various technical restrictions that are preferable are mentioned, but the scope of the present invention is not limited thereto unless otherwise mentioned specifically in the following description. Further, in each drawing, a same composing element is denoted with a same reference sign, and redundant detailed description thereof may be omitted.

Engine Control Device

Figure 1:
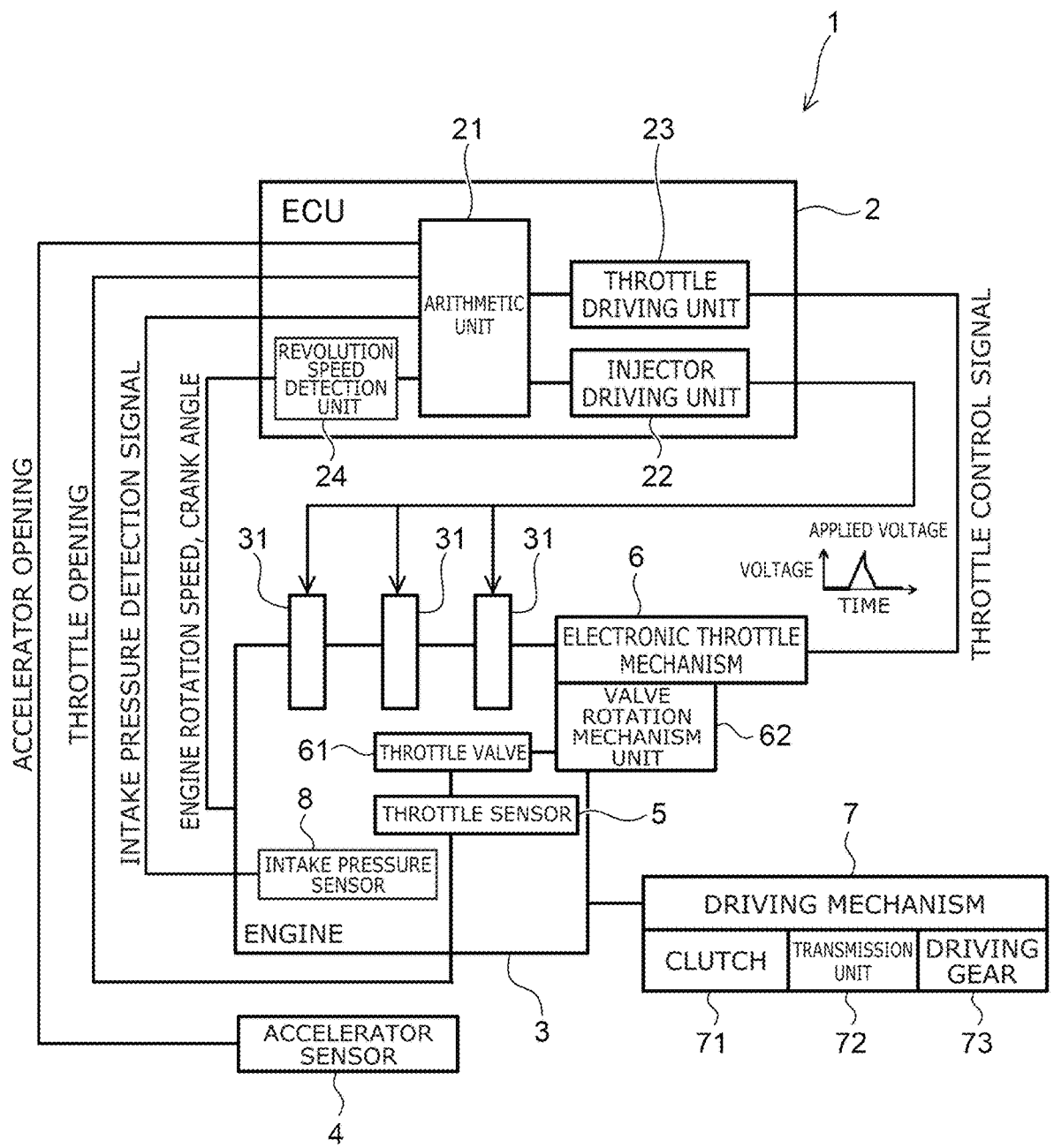
FIG. 1 is a block diagram depicting an overview of an engine control device and an engine device according to the present embodiment.

FIG. 1 is a block diagram depicting an overview of an engine control device and an engine device according to the present embodiment.

The engine control device 2 according to the present embodiment controls driving of an electronic throttle mechanism 6 that electronically drives a throttle valve 61 of an engine 3, and injectors (fuel injection mechanism) 31 which inject fuel. As indicated in FIG. 1, the engine control device 2 according to the present embodiment functions as a part of an electronic control unit (ECU). In the example in FIG. 1, three injectors 31 are installed in the engine 3. A number of the injectors 31 that are installed is not limited to three, but may be two or four or more. In other words, a number of cylinders of the engine 3 is not limited to three, but may be two or four or more.

The engine control device 2 indicated in FIG. 1 includes an arithmetic unit 21, an injector driving unit 22, a throttle driving unit 23 and a revolution speed detection unit 24. As indicated in FIG. 1, a detection signal on engine revolution speed and a detection signal on a crank angle are inputted from the engine 3 to the engine control device 2. Further, a detection signal on an accelerator opening is inputted from an accelerator sensor 4 to the engine control device 2, a detection signal on a throttle opening is inputted from a throttle sensor 5 to the engine control device 2, and a detection signal on intake pressure in an intake manifold of the engine 3 is inputted from an intake pressure sensor 8 to the engine control device 2.

The arithmetic unit 21 calculates an injection timing of the fuel injected from the injectors 31 and the injection amount thereof. For example, based on the detection signal on the engine revolution speed detected by the revolution speed detection unit 24 and the detection signal on the intake pressure sent from the intake pressure sensor 8, the arithmetic unit 21 calculates the injection amount of the fuel using a governor map (not illustrated), which is set in advance. The arithmetic unit 21 also calculates an energizing period (energizing time) of the injectors 31 using an injection period map (not illustrated), which is set in advance, based on the injection amount of the fuel which was set using the governor map, for example. In this way, the injection amount of the fuel is controlled based on the energizing period of the injectors 31, for example. The arithmetic unit 21 of the present embodiment is a central processing unit (CPU), for example.

The injector driving unit 22 controls driving of the injectors 31 based on the injection timing and injection amount of the fuel calculated by the arithmetic unit 21. For example, the injector driving unit 22 sends the control signals on the injection timing and injection amount of the fuel calculated by the arithmetic unit 21 to the injectors 31, or the injector driving unit 22 supplies boosted voltage (e.g. charge voltage of a capacitor) generated by a boosting circuit (not illustrated) or voltage supplied from a battery (not illustrated) to the injectors 31, based on the injection timing and the injection amount of the fuel calculated by the arithmetic unit 21. Thereby needle valves of the injectors 31 open, and injection of the fuel is started. When the energizing period of the injectors 31, which was set by the arithmetic unit 21, elapses from the point when the energization of the injectors 31 is started, the injector driving unit 22 stops supply of the voltage to the injectors 31. Then the needle valves of the injectors 31 close, and injection of the fuel ends.

The throttle driving unit 23 controls driving of the throttle valve 61 based on the throttle opening calculated by the arithmetic unit 21. For example, the throttle driving unit 23 receives the signal on the throttle opening calculated by the arithmetic unit 21, based on the signal on the accelerator opening detected by the accelerator sensor 4, and sends a control signal (throttle control signal) for driving the throttle valve 61 to the electronic throttle mechanism 6. The electronic throttle mechanism 6 receives the control signal sent from the throttle driving unit 23, and operates a valve rotation mechanism unit 62.

The valve rotation mechanism unit 62 includes a motor which is a driving source to rotate a rotary shaft of the throttle valve 61, and a link mechanism which transmits the rotation of the motor to the rotary shaft of the throttle valve 61. The valve rotation mechanism unit 62 (at least the link mechanism thereof) is installed in the engine 3. In the link mechanism, energizing means (e.g. spring) is installed so that the throttle valve 61 can be maintained at a mechanically neutral position in a state where no signal is being sent to the motor.

In a state where a throttle control signal is being sent from the throttle driving unit 23 to the electronic throttle mechanism 6, the electronic throttle mechanism 6 drives the motor of the valve rotation mechanism unit 62 based on the throttle control signal, so that the opening of the throttle valve 61 becomes a predetermined value. The throttle valve 61 is rotated by the link mechanism transmitting the driving of the motor to the rotary shaft of the throttle valve 61.

For example, in a case where the accelerator sensor 4 is detecting a state in which the accelerator is not operated (accelerator fully closed), a throttle control signal, to rotate the throttle valve 61 in the direction to fully close, is sent from the throttle driving unit 23 to the electronic throttle mechanism 6. The electronic throttle mechanism 6, which received this throttle control signal, drives the motor of the valve rotation mechanism unit 62, and rotates the throttle valve 61 from the mechanically neutral position in a direction to fully close the throttle valve 61.

In a case where the accelerator sensor 4 is detecting an accelerator opening in a state in which the accelerator is operated for a predetermined amount, a throttle control signal, to rotate the throttle valve 61 to an angle in accordance with the accelerator opening, is sent from the throttle driving unit 23 to the electronic throttle mechanism 6. The electronic throttle mechanism 6, which received this throttle control signal, drives the motor of the valve rotation mechanism unit 62, and rotates the throttle valve 61 from the mechanically neutral position in a direction to open the throttle valve 61 for a predetermined amount.

In this way, the motor of the valve rotation mechanism unit 62 is driven in accordance with the accelerator opening. This driving of the motor is transmitted to the rotary shaft of the throttle valve 61 using the link mechanism, and thereby the angle of the throttle valve 61 (throttle opening) is determined. In this electronic throttle mechanism 6, the angle of the throttle valve 61 in accordance with the accelerator opening is determined based on the calculation by the throttle driving unit 23, hence the relationship between the accelerator opening and the throttle opening can be changed in accordance with the traveling state, the traveling mode that is set, and the like.

Engine Device

The engine device 1 according to the present embodiment is installed in the engine 3 of a small vehicle or of a travelable industrial machine, such as a construction machine and an agricultural machine. The engine device 1 includes the above mentioned engine control device 2 according to the present embodiment, and a driving mechanism 7 which is driven by output of the engine 3. The driving mechanism 7 includes a clutch 71 which is disposed in a subsequent stage of the engine 3 and connects or disconnects the output of the engine 3, and a transmission unit 72, which is disposed in the subsequent stage of the clutch 71 and transmits the output of the engine 3. The transmission unit 72 includes a driving gear 73.

The clutch 71 is a centrifugal clutch, for example. The centrifugal clutch is connected when the output of the engine 3 becomes a predetermined revolution speed or more. The transmission unit 72 is a belt type continuously variable transmission, for example. The belt type continuously variable transmission can continuously shift speeds using a pully of which width changes depending on the revolution speed and a belt wound on this pulley.

In the engine device 1, the opening of the throttle valve 61 is electronically controlled by the accelerator, and the injection timing and the injection amount of the fuel by the injectors 31 are controlled by the engine revolution speed, throttle opening, crank angle, and the like. Then the output of the engine 3 is transmitted to such driving members as tires via the clutch 71 and the transmission unit 72.

In a case where a problem happens to the electronic throttle mechanism 6 in this engine device 1, control is performed in a limp home mode in which self-traveling is enabled as an emergency avoidance operation. For example, in a case where a problem happens to a transmission path of the throttle control signal from the throttle driving unit 23 to the electronic throttle mechanism 6, or a problem happens to the electronic throttle mechanism 6 and the motor to rotate the throttle valve 61 cannot be operated, the engine control device 2 shifts from the normal mode to the limp home mode.

In the limp home mode, the throttle valve 61 cannot be driven by the motor using the electronic throttle mechanism 6, and in this case, the opening of the throttle valve 61 is fixed to a default opening (an opening mechanically maintained by the valve rotation mechanism unit 62 installed in the engine 3) (enters a state where h default opening cannot be changed). Here the default opening has a variation which occurs within a range of the tolerance of the valve rotation mechanism unit 62 for rotating the throttle valve 61. This tolerance of the valve rotation mechanism unit 62 is about several degrees±angle of the throttle valve 61.

In the present embodiment, the engine control in the limp home mode is performed considering the variation of the default opening of the throttle valve 61 within the range of the tolerance of the valve rotation mechanism unit 62. In other words, in the case where the engine 3 is controlled in the limp home mode, and the revolution speed of the engine 3, detected by the revolution speed detection unit 24, exceeds a predetermined limiting value, the arithmetic unit 21 of the engine control device 2 performs an operation to suppress injection of the fuel to be injected by the injectors 31. This suppression of injection of the fuel in this operation includes decreasing the injection amount so that the revolution speed of the engine 3 does not exceed the predetermined limiting value, or at least temporarily stopping injection of fuel. Thereby in the state of operating under the limp home mode, which is a failsafe mode of the engine 3, the revolution speed of the engine 3 is prevented to exceed a predetermined revolution speed.

In the case where the revolution speed of the engine 3, detected by the revolution speed detection unit 24, is the above mentioned limiting value (engine revolution speed to suppress the fuel injection) or less in the operation in the limp home mode, on the other hand, the arithmetic unit 21 may determine the injection amount of the fuel to be injected by the injectors 31 based on the same calculation as the normal operation mode. Thereby in the case where the revolution speed of the engine 3 is the predetermined limiting value or less in the limp home mode, the injection amount of fuel, the same as in the normal operation mode, is injected, and good self-traveling is enabled even in the limp home mode.

Figure 2:
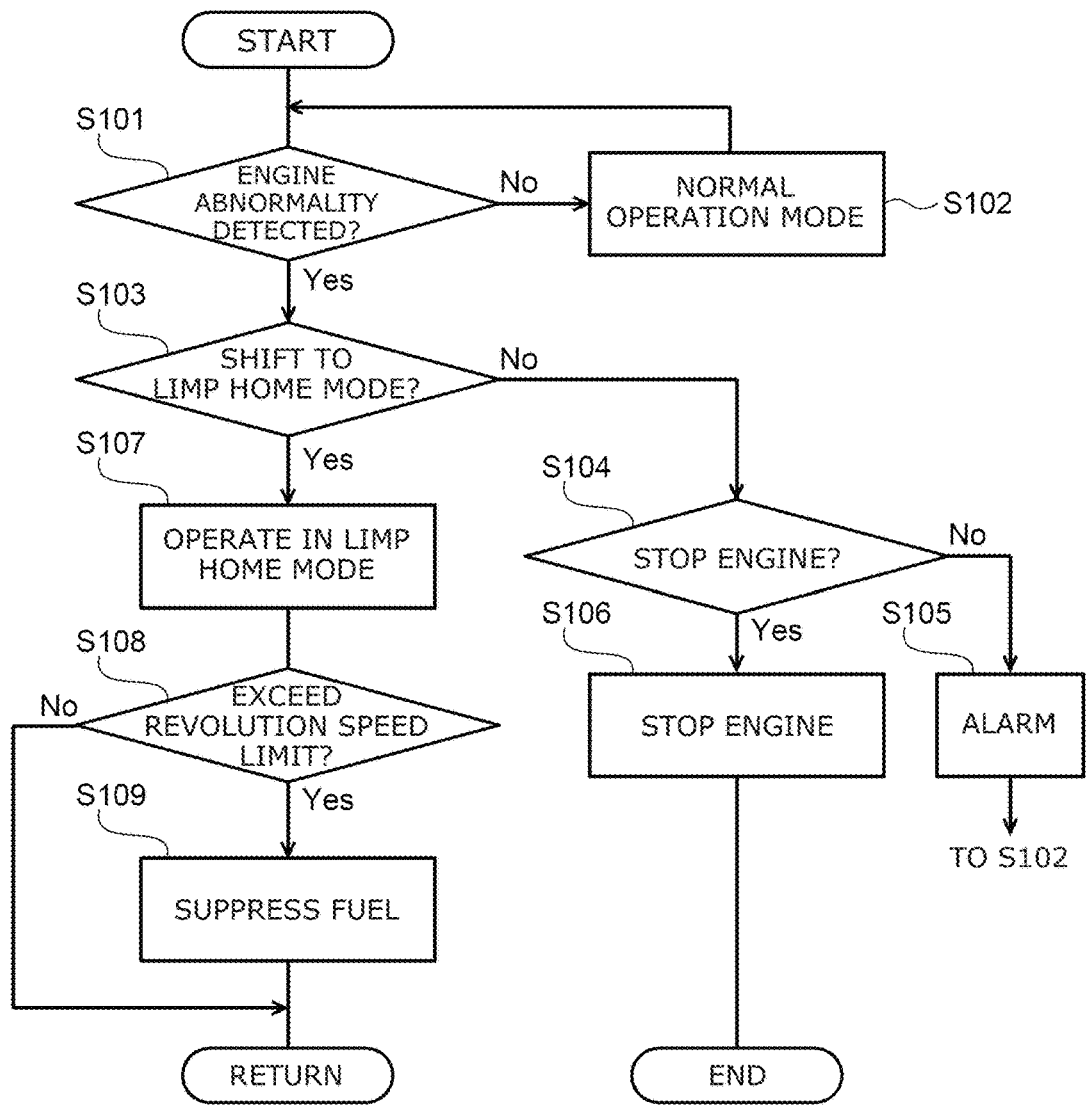
FIG. 2 is a flow chart depicting an example of control of the engine control device according to the present embodiment.

FIG. 2 is a flow chart depicting an example of control of the engine control device according to the present embodiment.

First in step S101, the arithmetic unit 21 determines whether an abnormality of the engine 3 is detected. If an abnormality is not detected, the control in the normal operation mode is performed in step S102. If an abnormality of the engine 3 is detected, the arithmetic unit 21 determines whether the operation mode is shifted to the limp home mode in step S103.

If it is determined in step S103 that the operation mode is not shifted to the limp home mode, the arithmetic unit 21 determines whether the engine 3 is stopped in step S104. If it is determined that the engine 3 is not stopped, the arithmetic unit 21 outputs an alarm in step S105. If it is determined that the engine 3 is stopped, on the other hand, the arithmetic unit 21 performs a control to stop the engine 3 in step S106.

If it is determined in step S103 that the operation mode is shifted to the limp home mode, the arithmetic unit 21 performs a control to shift the operation mode to the limp home mode in step S107. In the state where the operation mode has been shifted to the limp home mode, the arithmetic unit 21 determines whether the revolution speed limit is exceeded in step S108. In other words, in the limp home mode, the arithmetic unit 21 determines whether the revolution speed of the engine 3, detected by the revolution speed detection unit 24, exceeds the predetermined limiting value. If the revolution speed of the engine 3 exceeds the limiting value, the arithmetic unit 21 performs the fuel suppression in step S109.

In the case of performing the fuel suppression, the arithmetic unit 21 sends a fuel suppression control signal to the injector driving unit 22. Thereby the injector driving unit 22 sends a signal to suppress the injection amount, or to stop (including a temporary stop) the injection of the fuel to be injected from the injectors 31. During this fuel suppression, the arithmetic unit 21 receives a signal on the revolution speed of the engine 3 detected by the revolution speed detection unit 24, and sends a signal to control the injection amount of the fuel from the injectors 31 to the injector driving unit 22, so that the revolution speed of the engine 3 does not exceed the limiting value. Thereby in the limp home mode, the revolution speed of the engine 3 is maintained at a revolution speed at which self-traveling can be performed without exceeding the limiting value.

Here when the valve rotation mechanism unit 62 is installed at a reference position of the engine 3, if the tolerance of the valve rotation mechanism unit 62 from the neutral position of the throttle valve 61 is at maximum tolerance on the side of closing the throttle valve 61 (minus maximum tolerance), it is preferable to set the revolution speed of the engine 3 to a value that is at least the lower limit revolution speed of the engine 3, at which self-traveling in the limp home mode is possible. Then even if the valve rotation mechanism unit 62 is installed with the minus maximum tolerance, at least the lower limit revolution speed, at which self-traveling in the limp home mode is possible, can be maintained, hence good self-traveling is enabled.

Figure 3:
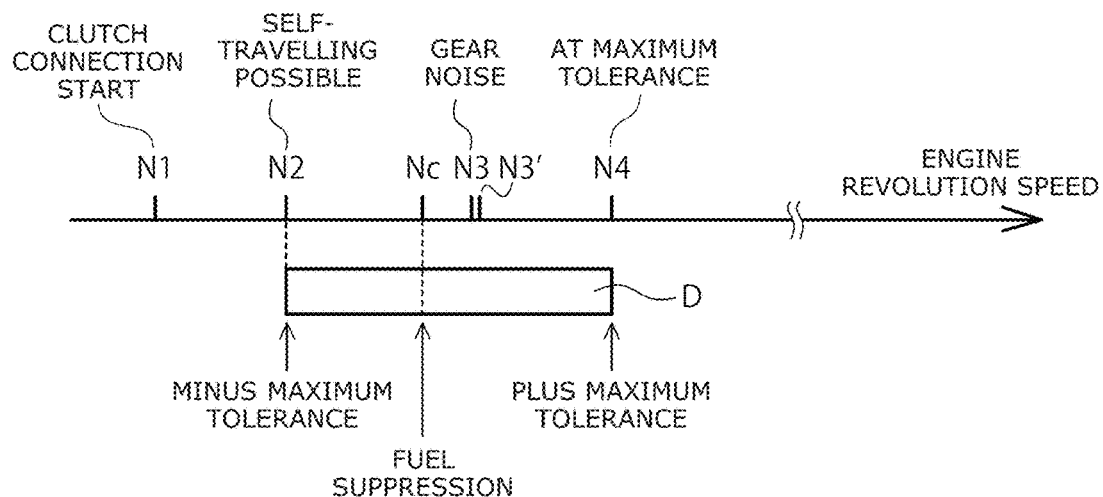
FIG. 3 is a diagram depicting an example of a relationship between engine revolution speed and a tolerance of a valve rotation mechanism unit.

FIG. 3 is a diagram depicting an example of a relationship between the engine revolution speed and the tolerance of the valve rotation mechanism unit. The abscissa in FIG. 3 indicates the revolution speed of the engine 3, and a horizontal bar D indicates a width of the revolution speed of the engine 3 based on the tolerance of the valve rotation mechanism unit 62.

As mentioned above, the valve rotation mechanism unit 62 has a tolerance in the rotation direction from the mechanical neutral position of the throttle valve 61. In other words, the valve rotation mechanism unit 62 is installed at the reference position of the engine 3, and even if the opening of the throttle valve 61 is at the mechanically neutral position in this state, the revolution speed of the engine 3 varies within the range of this tolerance. The horizontal bar D indicated in FIG. 3 indicates the width from the revolution speed of the engine 3 when the throttle valve 61 is at the neutral position in the state of the minus maximum tolerance (the case where the throttle valve 61 shifted largely on the side of closing) to the revolution speed of the engine 3 when the throttle valve 61 is at the neutral position in the state of the plus maximum tolerance (the case where the throttle valve 61 shifted on the side of opening).

Here in the relationship between the revolution speed of the engine 3 and the operation state of the engine device 1, it is assumed that the revolution speed of the engine 3, when the connection of the clutch 71 is started, is the revolution speed N1, and the revolution speed of the engine 3 that can be self-traveled after the clutch 71 is connected is the revolution speed N2 (revolution speed N2>revolution speed N1). Further, it is assumed that the upper limit revolution speed of the engine 3, at which the driving gear 73 in the transmission unit 72 can be engaged in the state where the clutch 71 is connected, is the revolution speed N3.

For example, in the case of shifting the driving position from the state where the driving gear 73 is not engaged (neutral position) to the state where driving is possible (e.g. drive position), the upper limit revolution speed of the engine 3, at which the driving gear 73 can be engaged in a state where the clutch 71 is connected (state where output of the engine 3 is being transmitted to the driving mechanism 7), is the revolution speed N3.

For example, it is assumed that the lower limit revolution speed of the engine 3, at which gear noise is generated when the driving gear 73 is attempted to be engaged in the state of the clutch 71 being connected and the driving gear 73 cannot be engaged, is the revolution speed N3'. Then the revolution speed N3 is the revolution speed that is slightly lower than the revolution speed N3' (revolution speed at which the driving gear 73 can be engaged even if gear noise is generated).

For example, in the present embodiment, the reference position of the valve rotation mechanism unit 62 installed in the engine 3 is set so that the revolution speed of the engine 3 becomes at least the revolution speed N2 at which self-traveling is possible, even if the tolerance from the neutral position of the throttle valve 61 is at the maximum tolerance on the side of closing the throttle valve 61 (minus maximum tolerance). Then even if the valve rotation mechanism unit 62 installed at the reference position of the engine 3 has the minus maximum tolerance, at least the revolution speed N2, which is the lower limit revolution speed with which self-traveling in the limp home mode is possible, can be maintained, hence good self-traveling is enabled.

However, in the case of setting the installation reference position of the valve rotation mechanism unit 62 such that the revolution speed becomes at least N2, even if the valve rotation mechanism unit 62 having the minus maximum tolerance is installed, as described above, the revolution speed of the engine 3 may reach revolution speed N4, exceeding the revolution speed N3 at the neutral position of the throttle valve 61, if the valve rotation having the maximum tolerance on the side of opening the throttle valve 61 (plus maximum tolerance) is installed. If the revolution speed of the engine is the revolution speed N4 exceeding the revolution speed N3', the driving gear 73 cannot be engaged. In other words, in the limp home mode, the driving gear 73 cannot be engaged even if the neutral position is shifted to the drive position, and self-traveling is disabled.

Therefore in the present embodiment, in the case where the revolution speed of the engine 3, detected by the revolution speed detection unit 24, becomes a revolution speed Nc, which is between the revolution speed N2 and the revolution speed N3, the arithmetic unit 21 performs control to suppress injection of the fuel to be injected by the injectors 31. In other words, in the case where the installation reference position of the valve rotation mechanism unit 62 is set such that revolution speed becomes at least the revolution speed N2 even if the valve rotation mechanism unit 62 having the minus maximum tolerance is installed, and then it is set such that if the revolution speed of the engine 3 exceeds the revolution speed Nc which is the predetermined limiting value (revolution speed Nc<revolution speed N3), the injection fuel to be injected by the injectors 31 is suppressed to prevent revolution speed of the engine 3 exceeding the revolution speed N3. Thereby in the limp home mode, regardless the tolerance of the valve rotation mechanism unit 62 that is installed, the revolution speed of the engine 3 becomes at least the revolution speed N2 with which self-traveling is possible, and not more than the revolution speed N3 at which the driving gear 73 can be engaged. As a result, the revolution speed of the engine 3 can be controlled to the revolution speed at which self-traveling is enabled without fail in the limp home mode.

According to this embodiment, the engine control device 2 and the engine device 1 that enable stable self-traveling of the engine 3 in the limp home mode can be provided.

An embodiment of the present invention has been described. The present invention, however, is not limited to this embodiment, and may be changed in various ways without departing from the scope of the claims. Composing elements of the above described embodiment may be partially omitted or may be arbitrarily combined in a manner that is different from above.

What is claimed is:

1. An engine control device to control an engine equipped with an electronic throttle mechanism and a fuel injection mechanism, comprising:
   a revolution speed detection unit that detects revolution speed of the engine; and
   an arithmetic unit that calculates an opening of a throttle valve opened by the electronic throttle mechanism, and an injection amount of fuel injected by the fuel injection mechanism, wherein
   the electronic throttle mechanism includes a valve rotation mechanism unit that rotates the throttle valve, and
   the valve rotation mechanism unit is configured to set the throttle valve at a mechanically neutral position in a case where electronic control of the electronic throttle mechanism is disabled,
   the valve rotation mechanism unit has a tolerance from the neutral position of the throttle valve in a rotating direction, and
   a reference position of the valve rotation mechanism unit installed in the engine is set so that the revolution speed of the engine detected by the revolution speed detection unit becomes at least a lower limit revolution speed that is a minimal speed at which self-traveling in a limp home mode is possible, even if the tolerance from the neutral position of the throttle valve is at the maximum tolerance on the side of closing the throttle valve,
   in an operation of the engine in the limp home mode, in a case where the revolution speed of the engine detected by the revolution speed detection unit exceeds a predetermined limiting value, the arithmetic unit performs an operation to suppress injection of the fuel to be injected by the fuel injection mechanism, and the limiting value of the revolution speed for suppressing the injection is set between the lower limit revolution speed and an upper limit revolution speed that is a maximum speed with which a driving gear to transmit output of the engine is engageable in a state where a clutch in a subsequent stage of the engine is connected.

2. The engine control device according to claim 1, wherein
the operation of the engine in the limp home mode, in a case where the revolution speed of the engine detected by the revolution speed detection unit is the limiting value or less, the arithmetic unit determines the injection amount of the fuel to be injected by the fuel injection mechanism by performing the same operation as a normal operation mode.

3. The engine control device according to claim 2, wherein
the normal operation mode is defined as a mode under which the engine device runs in a situation where no problem is detected,
the limp home mode is defined as another mode other than the normal operation mode, and
in the limp home mode, the opening of the throttle valve is fixed to degrees that is mechanically maintained by the valve rotation mechanism unit installed in the engine so that the throttle valve is not driven by a motor using the electronic throttle mechanism.

4. An engine device, comprising an engine control device to control an electronic throttle mechanism and a fuel injection mechanism, and a driving mechanism that is driven by output of an engine, wherein
the driving mechanism includes
a clutch that is installed in a subsequent stage of the engine, and
a transmission unit that is installed in a subsequent stage of the clutch and includes a driving gear to transmit output of the engine, wherein
the engine control device includes
a revolution speed detection unit that detects revolution speed of the engine, and
an arithmetic unit that calculates an valve rotation mechanism unit of a throttle valve opened by the electronic throttle mechanism, and an injection amount of fuel injected by the fuel injection mechanism, wherein
the electronic throttle mechanism includes a valve rotation mechanism unit that rotates the throttle valve, and
the valve rotation mechanism unit is configured to set the throttle valve at a mechanically neutral position in a case where electronic control of the electronic throttle mechanism is disabled,
the valve rotation mechanism unit has a tolerance from the neutral position of the throttle valve in a rotating direction, and p1 a reference position of the valve rotation mechanism unit installed in the engine is set so that the revolution speed of the engine detected by the revolution speed detection unit becomes at least a lower limit revolution speed that is a minimal speed at which self-traveling in a limp home mode is possible, even if the tolerance from the neutral position of the throttle valve is at the maximum tolerance on the side of closing the throttle valve,
in an operation of the engine in the limp home mode, in a case where the revolution speed of the engine detected by the revolution speed detection unit exceeds a predetermined limiting value, the arithmetic unit performs an operation to suppress injection of the fuel to be injected by the fuel injection mechanism, and
the limiting value of the revolution speed for suppressing the injection is set between the lower limit revolution speed and an upper limit revolution speed that is a maximum speed with which a driving gear to transmit output of the engine is engageable in a state where a clutch in a subsequent stage of the engine is connected.

5. The engine device according to claim 4, wherein
in the operation of the engine in the limp home mode, in a case where the revolution speed of the engine detected by the revolution speed detection unit is the limiting value or less, the arithmetic unit determines the injection amount of the fuel to be injected by the fuel injection mechanism by performing the same operation as a normal operation mode.

6. The engine control device according to claim 5, wherein
the normal operation mode is defined as a mode under which the engine device runs in a situation where no problem is detected,
the limp home mode is defined as another mode other than the normal operation mode, and
in the limp home mode, the opening of the throttle valve is fixed to degrees that is mechanically maintained by the valve rotation mechanism unit installed in the engine so that the throttle valve is not driven by a motor using the electronic throttle mechanism.

7. The engine device according to claim 4, wherein the clutch is a centrifugal clutch.

8. The engine device according to claim 4, wherein
the transmission unit includes a belt type continuously variable transmission that is installed between the clutch and the driving gear.

* * * * *